(12) United States Patent
Suzuki et al.

(10) Patent No.: US 11,217,843 B2
(45) Date of Patent: Jan. 4, 2022

(54) ELECTROCHEMICAL DEVICE SYSTEM

(71) Applicant: DENSO CORPORATION, Kariya (JP)

(72) Inventors: Yosuke Suzuki, Kariya (JP); Kan Kitagawa, Kariya (JP); Hidehiko Hiramatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 16/411,182

(22) Filed: May 14, 2019

(65) Prior Publication Data

US 2019/0267688 A1     Aug. 29, 2019

Related U.S. Application Data

(63) Continuation of application No. PCT/JP2017/039648, filed on Nov. 2, 2017.

(30) Foreign Application Priority Data

Dec. 7, 2016  (JP) .............................. JP2016-237793

(51) Int. Cl.
| | |
|---|---|
| *H01M 12/02* | (2006.01) |
| *H01M 4/90* | (2006.01) |
| *H01M 4/92* | (2006.01) |
| *H01M 12/08* | (2006.01) |
| *H01M 10/44* | (2006.01) |
| *H02J 7/00* | (2006.01) |
| *H01M 4/86* | (2006.01) |

(52) U.S. Cl.
CPC ......... *H01M 12/02* (2013.01); *H01M 4/8605* (2013.01); *H01M 4/8657* (2013.01); *H01M 4/9016* (2013.01); *H01M 4/9041* (2013.01); *H01M 4/92* (2013.01); *H01M 10/44* (2013.01); *H01M 12/08* (2013.01); *H02J 7/00* (2013.01); *H01M 2004/8689* (2013.01); *Y02E 60/10* (2013.01)

(58) Field of Classification Search
CPC ...................................................... H01M 12/08
See application file for complete search history.

(56) References Cited

U.S. PATENT DOCUMENTS

| | | |
|---|---|---|
| 2009/0053594 A1 | 2/2009 | Johnson et al. |
| 2010/0273066 A1 | 10/2010 | Flanagan et al. |

(Continued)

FOREIGN PATENT DOCUMENTS

| | | |
|---|---|---|
| CN | 101409376 A | 4/2009 |
| CN | 104466203 A | 3/2015 |

(Continued)

*Primary Examiner* — Robert S Carrico
(74) *Attorney, Agent, or Firm* — Harness, Dickey & Pierce, P.L.C.

(57) ABSTRACT

The present disclosure provides an electrochemical device system including an electrochemical device and a controller. The electrochemical device includes a negative electrode capable of occluding and releasing lithium ion, a positive electrode using oxygen as a positive electrode active material and reducing oxygen during discharge, and a solid electrolyte disposed between the negative electrode and the positive electrode and capable of conducting lithium ion. The controller performs current control during discharge of the electrochemical device.

11 Claims, 6 Drawing Sheets

(56) References Cited

U.S. PATENT DOCUMENTS

| | | | |
|---|---|---|---|
| 2013/0045428 A1* | 2/2013 | Visco | H01M 12/08 |
| | | | 429/405 |
| 2013/0115527 A1* | 5/2013 | Au | H01M 4/8605 |
| | | | 429/405 |
| 2013/0130131 A1 | 5/2013 | Johnson et al. | |
| 2016/0322686 A1* | 11/2016 | Ko | H01M 12/08 |
| 2017/0222287 A1* | 8/2017 | Suzuki | H01M 12/08 |
| 2018/0183122 A1* | 6/2018 | Grey | H01M 4/48 |

FOREIGN PATENT DOCUMENTS

| | | | | |
|---|---|---|---|---|
| JP | 2011096586 A | | 5/2011 | |
| JP | 2016091995 A | | 5/2016 | |
| WO | WO-2016067592 A1 | * | 5/2016 | H01M 12/08 |
| WO | WO-2017159420 A1 | * | 9/2017 | H01M 12/08 |

\* cited by examiner

ELECTROCHEMICAL DEVICE SYSTEM

CROSS REFERENCE TO RELATED APPLICATIONS

The present application is a continuation application of International Patent Application No. PCT/JP2017/039648 filed on Nov. 2, 2017, which designated the United States and claims the benefit of priority from Japanese Patent Application No. 2016-237793 filed on Dec. 7, 2016. The entire disclosures of all of the above applications are incorporated herein by reference.

TECHNICAL FIELD

The present disclosure relates to an electrochemical device system including an electrochemical device.

BACKGROUND

In recent years, with the development of portable devices such as personal computers and mobile phones, demand for batteries as power sources has been greatly increased. In order to realize a battery with a larger capacity, researches on lithium air batteries using oxygen in the air as a positive electrode active material are advanced. The lithium air battery has high energy density.

SUMMARY

The present disclosure provides an electrochemical device system including an electrochemical device and a controller. The electrochemical device includes a negative electrode capable of occluding and releasing lithium ion, a positive electrode using oxygen as a positive electrode active material and reducing oxygen during discharge, and a solid electrolyte disposed between the negative electrode and the positive electrode and capable of conducting lithium ion. The controller performs current control during discharge of the electrochemical device.

BRIEF DESCRIPTION OF THE DRAWINGS

The above and other objects, features and advantages of the present disclosure will become more apparent from the following detailed description made with reference to the accompanying drawings, in which.

DETAILED DESCRIPTION

It is reported that the lithium air battery exhibits a very large discharge capacity since the positive electrode active material needs not to be filled.

For example, the lithium air battery includes a positive electrode layer containing a conductive material, a catalyst and a binder, a positive electrode current collector collecting current from the positive electrode layer, a negative electrode layer made of a metal or an alloy, a negative electrode current collector collecting current from the negative electrode layer, and an electrolyte disposed between the positive electrode layer and the negative electrode layer. The lithium air battery is considered to undergo the following charge-discharge reaction.

[During Discharge]

Negative electrode: $Li \rightarrow Li^+ + e^-$

Positive electrode: $2Li^+ + O_2 + 2e^- \rightarrow Li_2O_2$

[During Charge]

Negative electrode: $Li^+ + e^- \rightarrow Li$

Positive electrode: $Li_2O_2 \rightarrow 2Li^+ + O_2 + 2e^-$

As described above, in the positive electrode of the lithium air battery, a reaction in which a reaction product ($Li_2O_2$) is generated from lithium ion and oxygen occurs during discharge, and a reaction in which the reaction product is decomposed into lithium ion and oxygen occurs during charge.

For example, a lithium air battery may include a negative electrode, a positive electrode with a catalyst for oxygen reduction and a first solid electrolyte layer, and a second solid electrolyte layer disposed between the negative electrode and the positive electrode. The first solid electrolyte layer and the second solid electrolyte layer may not be physically separated but may be continuous.

However, in the lithium air battery described above, an organic electrolytic solution and an aqueous electrolytic solution are required on the surface of the positive electrode. Therefore, degradation of the performance due to volatilization may not be avoided.

Figure 1:
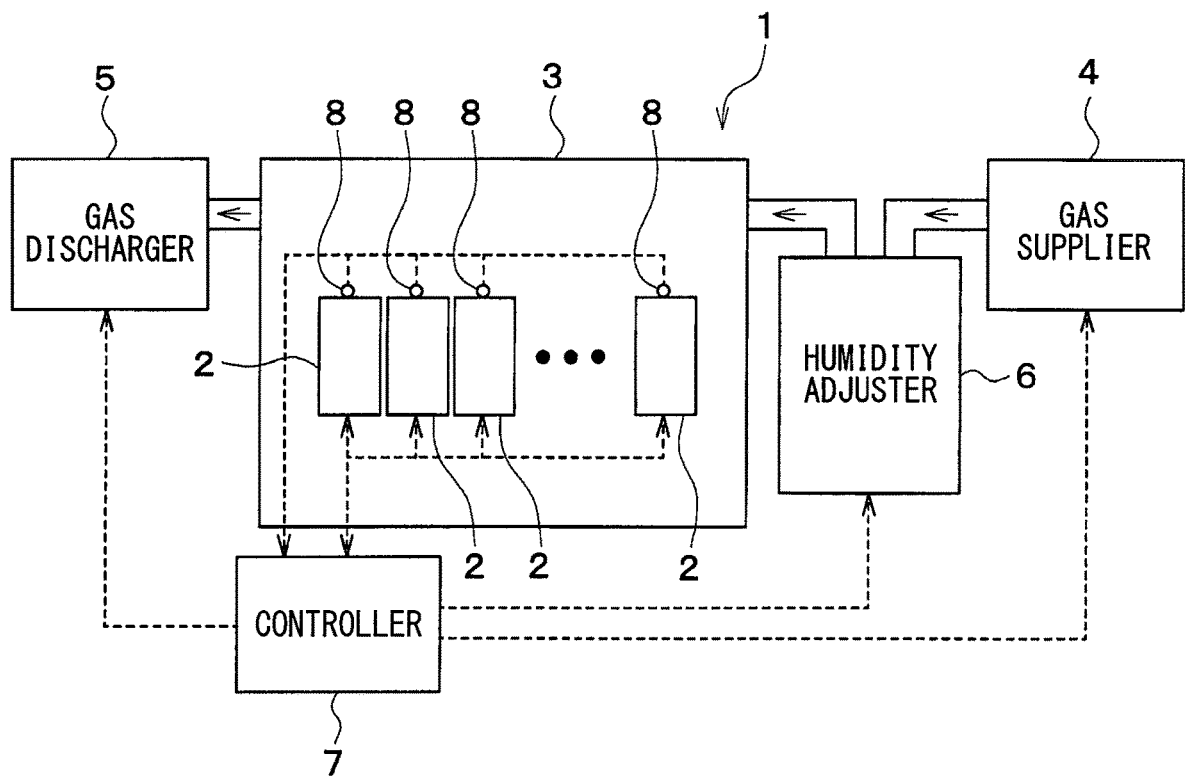
FIG. 1 is a diagram showing a configuration of a lithium air battery system of an embodiment.

Hereinafter, a lithium air battery system according to an embodiment of the present disclosure will be specifically described. As shown in FIG. 1, the lithium air battery system 1 of the present embodiment includes a lithium air battery 2, a gas supplier 4, a gas discharger 5, a humidity adjuster 6, a controller 7, and the like. Although not shown, members necessary for the configuration of the lithium air battery system 1, such as conducting wires and electrode terminals connected to the electrodes of the air battery 2, are also provided. The lithium air battery 2 corresponds to the electrochemical device of the present disclosure.

Figure 2:
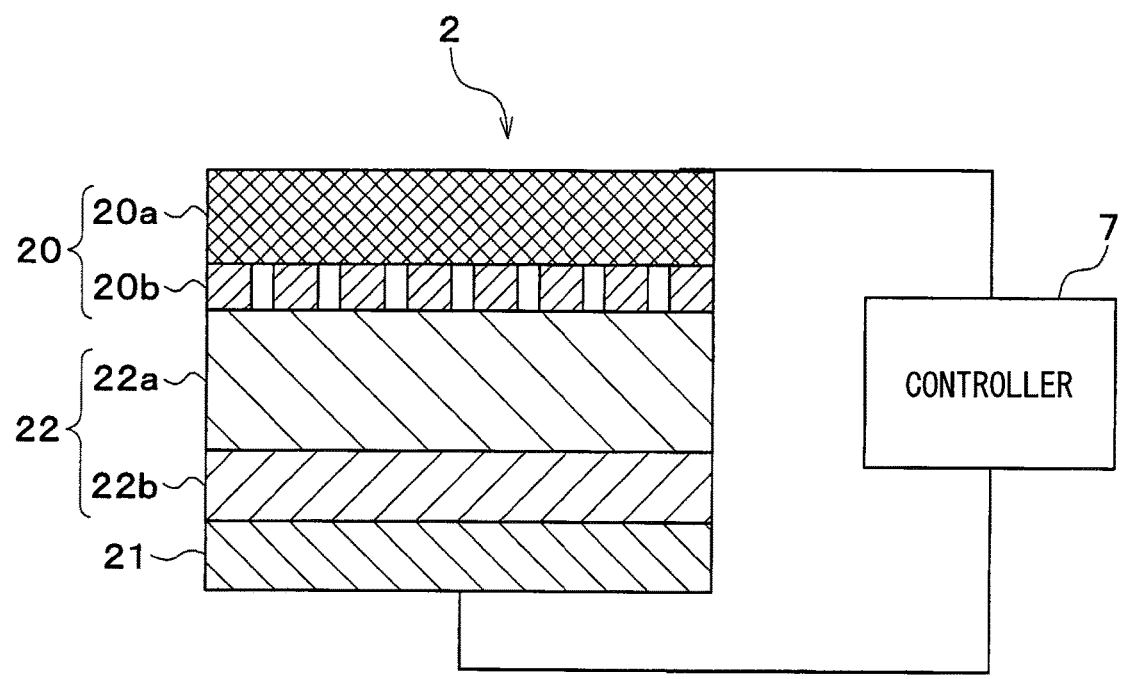
FIG. 2 is a diagram schematically showing a configuration of a lithium air battery.

As shown in FIG. 2, the lithium air battery 2 (hereinafter referred to as "air battery 2") includes a positive electrode 20, a negative electrode 21 and a solid electrolyte layer 22. The positive electrode 20 may also be called an air electrode. The air battery 2 is provided as a rechargeable battery that can be charged and discharged. In the present embodiment, all of the positive electrode 20, the negative electrode 21, and the solid electrolyte layer 22 of the air battery 2 are solids.

The air battery 2 of the present embodiment is provided as a laminate in which the cathode 20, the anode 21, and the solid electrolyte layer 22 are laminated. The outer shape of the air battery 2 is not particularly limited as long as a shape that allows a gas containing oxygen to be brought into contact with the positive electrode 20. As a shape (configuration) by which the gas can be brought into contact with the positive electrode 20, a shape having a gas intake port can be exemplified. As the outer shape, an arbitrary shape such as a cylindrical shape, a square shape, a button shape, a coin shape, a flat shape, or the like may be exemplified.

A material having a catalytic function to promote a reaction of oxygen as the positive electrode active material (that is, reduction reaction) is used as the positive electrode material included in the positive electrode 20. As the oxygen of the positive electrode active material, oxygen existing around the air battery 2, particularly, the positive electrode 20 (in other words, oxygen contained in atmosphere) is used. The positive electrode 20 provides a gas reaction layer.

The cathode 20 of the present embodiment includes a low catalytic ability material having low catalytic ability for dissociation of oxygen and a high catalytic ability material having high catalytic ability for dissociation of oxygen. The low catalytic ability material may include materials that do not have catalytic ability for the dissociation of oxygen. The low catalytic ability material may be any material as long as having lower catalytic ability for dissociation of oxygen than the high catalytic ability material (for example, Pt).

Examples of the low catalytic ability material include Ti, Au, Ni, carbon and a conductive oxide. As the conductive oxide, for example, LSCF ($La_{1-x}Sr_xCo_{1-y}Fe_yO_{3-\delta}$) and $MnO_2$ can be cited. As the high catalytic ability material, for example, Pt, $NiCo_2O_4$ can be cited.

In the cathode 20 of the present embodiment, a Ti electrode 20a is provided as the low catalytic ability material and a Pt electrode 20b is provided as the high catalytic ability material. The Ti electrode 20a is a porous material and the Pt electrode 20b is a comb-shaped electrode. In the present embodiment, the Ti porous material constituting the Ti electrode 20a has a porosity of 80%. The Ti electrode 20a and the Pt electrode 20b are stacked. The Pt electrode 20b is in contact with the solid electrolyte layer 22, and the Ti electrode 20a is in contact with the Pt electrode 20b.

The negative electrode 21 has a negative electrode material containing a negative electrode active material capable of occluding and releasing lithium ion. The negative electrode active material is one, two or more materials selected from the group consisting of metallic lithium, a lithium alloy, a metal material capable of occluding and releasing lithium, an alloy material capable of occluding and releasing lithium, and a compound capable of occluding and releasing lithium. In the present embodiment, metallic lithium is used as the negative electrode 21. The negative electrode 21 provides a metal storage layer.

The solid electrolyte layer 22 is disposed between the cathode 20 and the anode 21 and is made of a solid electrolyte capable of conducting lithium ion. It is preferable to use a material having no conductivity of electron and a high conductivity of lithium ion as the solid electrolyte included in the solid electrolyte layer 22. The solid electrolyte layer 22 functions as a transmission path through which lithium ion moves between the positive electrode 20 and the negative electrode 21. The solid electrolyte layer 22 may be a single layer or a plurality of layers.

In the solid electrolyte layer 22 of the present embodiment, two layers of a first electrolyte layer 22a and a second electrolyte layer 22b are laminated. The first electrolyte layer 22a is provided adjacent to the positive electrode 20 and the second electrolyte layer 22b is provided adjacent to the negative electrode 21.

As the first electrolyte layer 22a, LATP ($Li_{1.3}Al_{0.3}Ti_{1.7}(PO_4)_3$) which is a Li—Al—Ti—P—O type NASICON type oxide is used. As the second electrolyte layer 22b, an electrolyte formed of PEO (polyethylene oxide) and LiTFSI (lithium bistrifluoromethanesulfonimide: $Li(CF_3SO_2)_2N$) is used. The second electrolyte layer 22b is provided to prevent LATP constituting the first electrolyte layer 22a from reacting with the metal Li constituting the negative electrode 21.

Returning to FIG. 1, the air battery 2 is disposed inside the case 3. The case 3 provides an enclosed space capable of accommodating the air battery 2 therein. The configuration of the case 3 is not limited, and for example, a chamber can be used. In the present embodiment, a plurality of air batteries 2 is provided inside the case 3.

The gas supplier 4 is a device capable of controlling the kind (composition) and inflow amount of the gas supplied into the case 3. For example, a device having a gas cylinder, a pipe line connecting the gas cylinder and the inside of the case 3, and a valve for controlling the flow rate of the gas flowing in the pipe can be mentioned.

The gas supplied by the gas supplier 4 is not limited as long as containing oxygen. For example, gas such as air or pure oxygen gas can be mentioned.

The gas discharger 5 is a device capable of controlling the discharge amount of the gas discharged from the inside of the case 3. For example, a device having, a pipe line connecting the outside and the inside of the case 3, and a valve for controlling the flow rate of the gas flowing in the pipe can be mentioned.

The gas atmosphere containing oxygen in the case 3 is adjusted by the gas supply of the gas supplier 4 and the gas discharge of the gas discharger 5. Therefore, the gas supplier 4 and the gas discharger 5 provide an atmosphere adjuster adjusting the gas atmosphere in the case 3.

The humidity adjuster 6 is a humidifying device that humidifies the gas containing oxygen in contact with the positive electrode 20 of the air battery 2. Specifically, the humidity adjuster 6 humidifies the gas supplied from the gas supplier 4 to the interior of the case 3. The humidified gas (that is, gas containing vapor phase water) is supplied to the positive electrode 20 of the air battery 2 inside the case 3 and is in contact with the positive electrode 20.

The humidity adjuster 6 humidifies the gas supplied from the gas supplier 4 to supply gas phase of water (that is, water vapor) to the positive electrode 20. By the humidification of the supply gas by the humidity adjuster 6, reduction of oxygen introduced into the positive electrode 20 can be performed in the presence of gas phase water.

The humidity adjuster 6 is capable of adjusting the relative humidity of the gas supplied to the positive electrode 20 of the air battery 2 (hereinafter also referred to as "supply gas") by adjusting the humidification amount of the supply gas. The humidity adjuster 6 is not particularly limited as long as capable of adjusting the humidification amount of the supply gas. Adjustment of the humidification amount of the supply gas by the humidity adjuster 6 is controlled by the controller 7 described later. In this specification, "humidity" means "relative humidity".

The controller 7 includes a known microcomputer which includes a CPU, a ROM, and a RAM and a peripheral circuit thereof, and performs various calculations and processes in accordance with air condition control programs stored in the ROM. The controller 7 is a controller that controls operations of the gas supplier 4, the gas discharger 5, the humidity adjuster 6, and the like connected to the output.

Although the controller 7 integrally includes controllers for controlling various control target devices connected to the output, a configuration (hardware and software) for controlling the operation of each control target device constitutes a controller for controlling the operation of each control target device.

A detection signal of the temperature sensor 8 and the like is input to the input of the controller 7. The temperature sensor 8 is a temperature detector that detects the temperature of the air battery 2 (hereinafter also referred to as "battery temperature"). It is preferable that the temperature sensor 8 detects the temperature at least in the vicinity of the positive electrode 20 of the air battery 2. The temperature sensor 8 is provided in each of the plurality of air batteries 2.

The controller 7 controls the humidity of the gas by the humidity adjuster 6 based on the battery temperature detected by the temperature sensor 8. Further, the controller 7 controls the voltage and the current of the air battery 2 based on the battery temperature and the humidity of the supply gas. Further, when discharge is performed in each air battery 2, the controller 7 stores the discharge amount of each air battery 2.

In the positive electrode 20, a reaction between lithium ion and oxygen occurs by discharge, and a lithium compound containing Li as a reaction product is generated on the surface of the positive electrode 20. The reaction product is solid and precipitates in the reaction field of the positive electrode 20. There are plural kinds of reaction products, and $Li_2O_2$ and LiOH are contained. In the positive electrode 20, a reaction in which the reaction product is decomposed by charge occurs, and lithium ion and oxygen are generated. Focusing on oxygen, in the positive electrode 20, oxygen is stored with the generation of the reaction product and oxygen is released with the decomposition of the reaction product.

Figure 3:
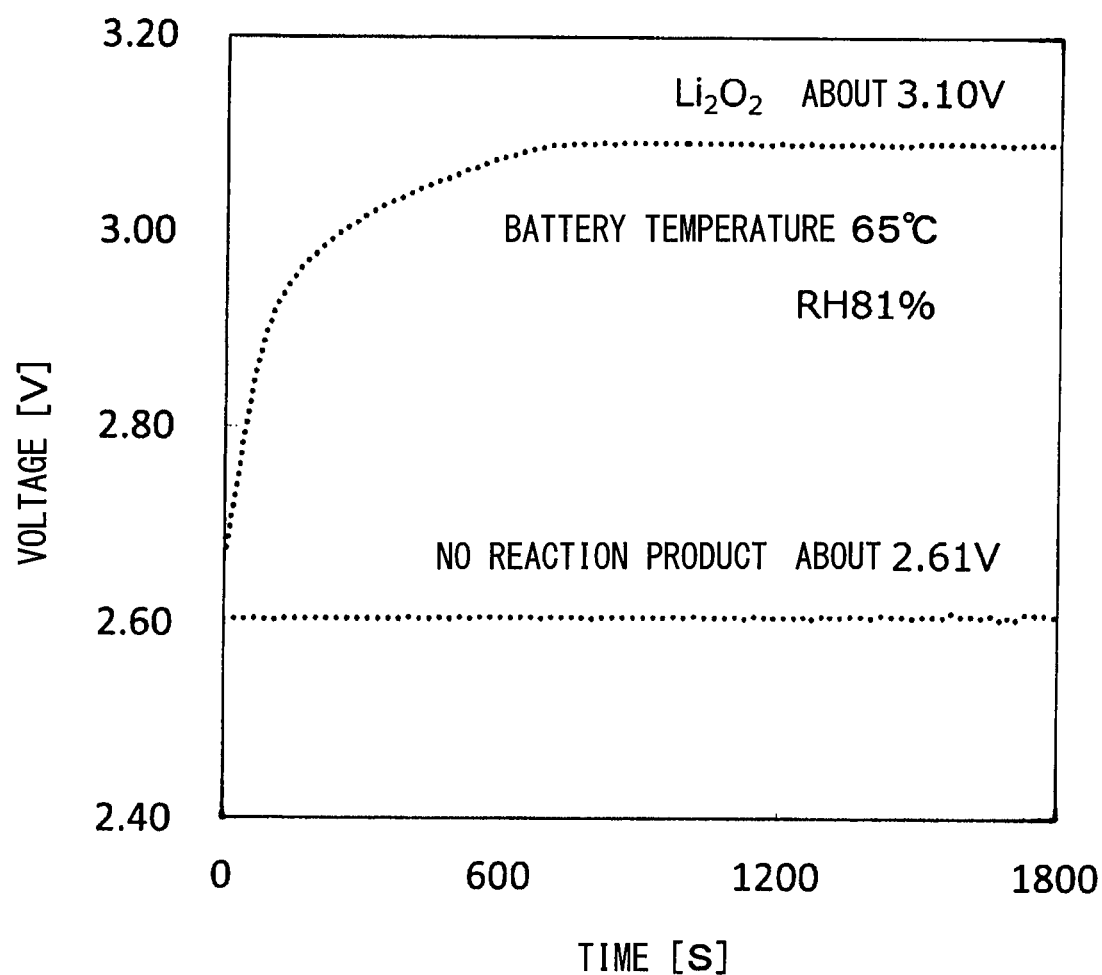
FIG. 3 is a diagram showing a relationship between presence or absence of a reaction product and an OCV of the lithium air battery.

FIG. 3 shows the OCV of the air battery 2 in a case where $Li_2O_2$ exists as a reaction product in the cathode 20 and in the case where no reaction product is present in the cathode 20. The measurement of OCV shown in FIG. 3 was carried out with the battery temperature set at 65° C. and the humidity of the supply gas set at 81%.

As shown in FIG. 3, when the reaction product is not present in the positive electrode 20, the OCV is about 2.61 V. On the other hand, in the case where $Li_2O_2$ is generated in the positive electrode 20, the OCV is about 3.10 V. When LiOH is generated in the positive electrode 20, the same result is obtained as in the case where $Li_2O_2$ is generated in the positive electrode 20. That is, since the reaction product is present in the positive electrode 20, a high potential can be obtained.

The main reactions of lithium and oxygen during the discharge in the positive electrode 20 include a two-electron reaction in which $Li_2O_2$ is generated and a four-electron reaction in which LiOH is generated. In a saturated aqueous solution of LiOH, the electromotive force in the two-electron reaction is about 3 V, and the electromotive force in the four-electron reaction is 3.45 V. The reaction formulas of the two-electron reaction and the four-electron reaction are as follows.

[Two-Electron Reaction]

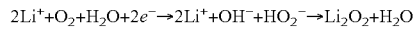

[Four-Electron Reaction]

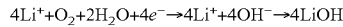

In the Ti electrode 20a, mainly two-electron reaction progresses and in the Pt electrode 20b, mainly two-electron reaction and four-electron reaction progress.

Figure 4:
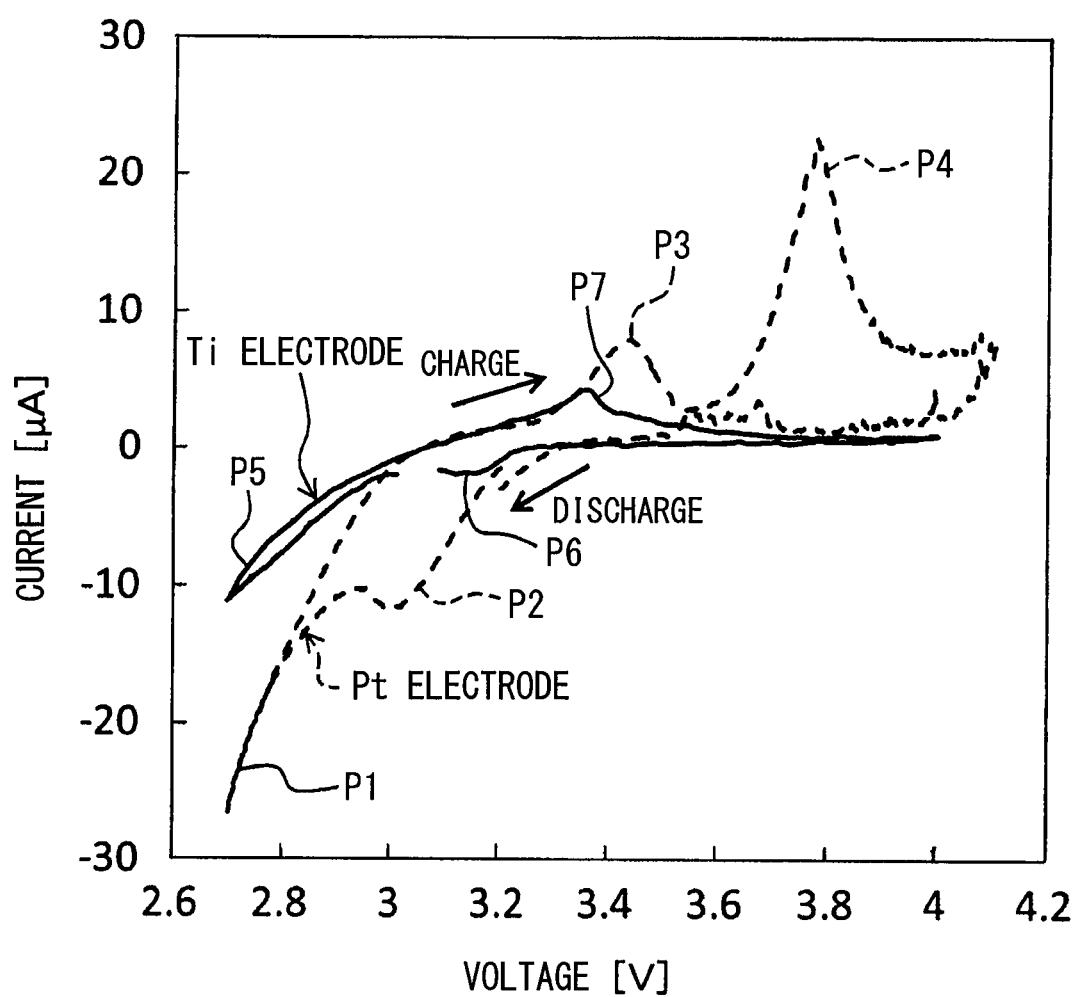
FIG. 4 is a diagram showing CV curves of a Ti electrode and a Pt electrode when the lithium air battery is charged and discharged.

FIG. 4 shows CV curves of the Ti electrode 20a and the Pt electrode 20b when the air battery 2 is discharged and then charged. In FIG. 4, the solid line is the CV curve of the Ti electrode 20a and the broken line is the CV curve of the Pt electrode 20b. The CV measurement of the Ti electrode 20a was performed with the battery temperature set at 60° C. and the humidity of the supply gas set at 77%. The CV measurement for the Pt electrode 20b was performed with the battery temperature set at 65° C. and the humidity of the supply gas set at 81%.

As shown in FIG. 4, in the CV curve of the Pt electrode 20b, there are two peaks of the current value at the time of discharge and at the time of charge.

Both peaks P1 and P2 at the time of discharge are considered to be peaks of a two-electron reaction. The reaction by the P1 peak is referred to as "P1 reaction", the product as "P1 product". The reaction by P2 peak is referred to as "P2 reaction", and the product as "P2 product". At the time of discharge, the peak of the P1 product is larger than the peak of the P2 product, indicating that the amount of P1 product generated is larger than that of the P2 product.

The electromotive force in the P1 reaction is 2.99 V, and the electromotive force in the P2 reaction is 3.1 V. Therefore, when the potential is higher than 2.99 V, it is considered that the P2 product is generated by the P2 reaction, and the P1 product is generated by the P1 reaction at the potential of 2.99 V or lower. The value of the electromotive force given here is the electromotive force when water is involved in the reaction, and the theoretical electromotive force of the P1 reaction when the water is not involved in the reaction is 2.96 V.

Among the peaks P3 and P4 during charge, the peak P3 on the low potential side corresponds to the decomposition reaction of $Li_2O_2$, and the peak P4 on the high potential side corresponds to the decomposition reaction of LiOH. At the time of charging, the peak P4 corresponding to LiOH is larger than the peak P3 corresponding to $Li_2O_2$, indicating that the decomposition amount of LiOH is larger than that of $Li_2O_2$.

That is, in the Pt electrode 20b, the amount of decomposition of $Li_2O_2$ during charge is smaller than the amount of $Li_2O_2$ generated during the discharge, and the decomposition amount of LiOH is increased. This is presumed to be due to the fact that the Pt electrode 20b has a high oxygen dissociation function and therefore accelerates the reaction of generating LiOH from $Li_2O_2$ when decomposing the reaction product during charge. Therefore, in the Pt electrode 20b, whichever P1 product or P2 product is produced, the P1 product and P2 product change to LiOH by reaction with moisture in the measurement gas, and the charging reaction decomposes LiOH and decreases efficiency.

Also, in the CV curve of the Ti electrode 20a, peaks P5 and P6 of two current values exist at the time of discharge, and a peak P7 of one current value is present at the time of charge. The peak P5 at the time of discharge corresponds to the formation reaction of $Li_2O_2$, and the peak P7 at the time of charge corresponds to the decomposition reaction of $Li_2O_2$. The decomposition current flowing on the higher potential side than the peak P7 during charge is considered to correspond to the product of the peak P6 at the time of discharge.

In the CV curve of the Ti electrode 20a, there is no peak on the high potential side during charge as seen in the CV curve of the Pt electrode 20b. This is presumed to be due to the fact that the Ti electrode 20a has a low oxygen dissociation function and therefore does not accelerate the reaction of generating LiOH from $Li_2O_2$ when decomposing the reaction product during charge. Further, in the Ti electrode 20a, it is possible to control which of the P1 product or the P2 product is the main product by controlling the discharge voltage.

Therefore, it is most efficient to generate $Li_2O_2$ at the Ti electrode 20a during discharge and decompose $Li_2O_2$ at the Ti electrode 20a during charge. However, in the Ti electrode 20a, a reaction to generate $Li_2O_2$ directly from lithium ion and oxygen is less likely to occur, and a reaction to generate $Li_2O_2$ is likely to occur due to the presence of LiOH or $Li_2O_2$. In particular, since LiOH is a lithium ion conduction path, LiOH can promote the generation reaction of $Li_2O_2$ even in a small amount. Therefore, in order to efficiently generate $Li_2O_2$ at the Ti electrode 20a during discharge, it is desirable that LiOH or $Li_2O_2$ exists in the Ti electrode 20a.

In the Pt electrode 20b, LiOH is generated at the time of discharge. When LiOH generated at the Pt electrode 20b moves to the Ti electrode 20a, it is possible to efficiently generate $Li_2O_2$ at the Ti electrode 20a. The Ti electrode 20a of the present embodiment is a porous material, and LiOH formed in the Pt electrode 20b and liquefied easily interpenetrates into the porous material.

Figure 5:
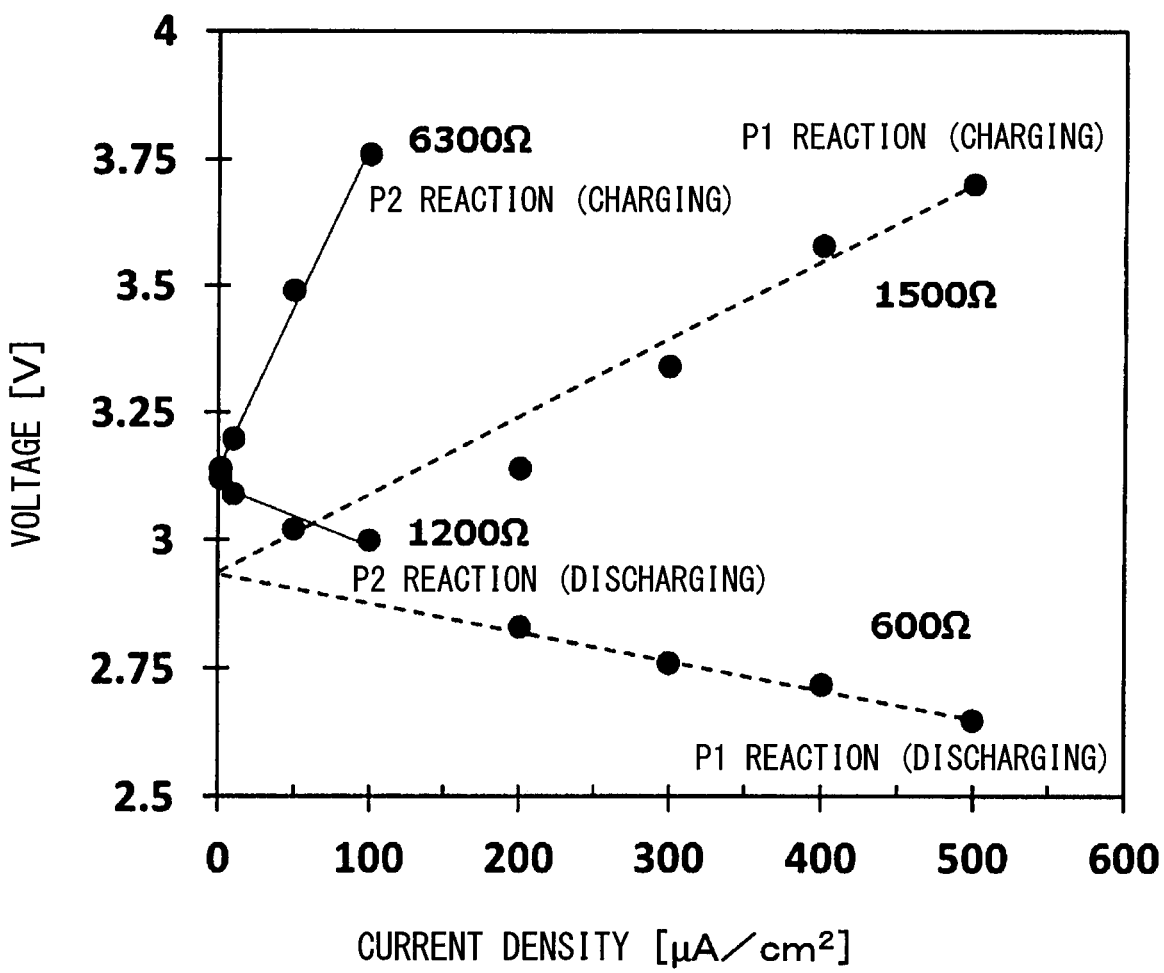
FIG. 5 is a diagram showing a relationship between current density and voltage during discharging and charging of the lithium air battery.

FIG. 5 shows a relationship between the voltage and the current density in the discharging of the air battery 2, and a relationship between the voltage and the current density in the charging of the air battery 2. In FIG. 5, a solid line shows a case where a two-electron reaction (P2 reaction) of lithium ion and oxygen occurs in the positive electrode 20. A broken line shows a case where a two-electron reaction (P1 reaction) of lithium ion and oxygen in the positive electrode 20. The voltage in FIG. 5 indicates the charge and discharge voltage.

As shown in FIG. 5, in the P1 reaction and the P2 reaction, the greater the current density, the greater the potential difference between charge and discharge. The greater the potential difference between charge and discharge at the same current density, the greater the energy loss and the lower the energy efficiency. That is, both the P1 reaction and the P2 reaction have lower energy efficiency as the current density increases.

As shown in FIG. 5, the charge voltage is lower when the P1 product is generated by two-electron reaction than when the P2 product is generated by the two-electron reaction. The potential difference between charge and discharge is smaller in the P1 reaction than the P2 reaction. In other words, the P1 reaction has lower energy loss and higher energy efficiency than the P2 reaction. This is due to the fact that the P1 product is lower in energy required for generation and decomposition than the P2 product. Therefore, it is desirable to generate the P1 product as the reaction product at the cathode 20 at the time of discharge, and it is desirable to control the current value so that the discharge voltage of the air battery 2 is 2.96 V or less.

The relationship between the voltage and the current density of the air battery 2 shown in FIG. 5 is stored in the controller 7 as a control map. The relationship between the voltage and the current density of the air battery 2 shown in FIG. 5 differs depending on the battery temperature and the humidity of the supply gas. For this reason, a plurality of control maps associated with the voltage and the current density of the air battery 2 are prepared for each humidity of the battery temperature and the supplied gas humidity. The controller 7 can determine the current value of the air battery 2 so that the reaction overvoltage becomes a constant value of 2.96 V or less by using the control map selected based on the battery temperature and the humidity of the supply gas.

Here, the surface ion conductive layer formed on the surface of the reaction product (mainly $Li_2O_2$) generated in the positive electrode 20 by discharge will be described. The surface of the reaction product formed in the positive electrode 20 is in contact with a gas containing vapor of water. Therefore, on the surface of the reaction product, part of the lithium contained in the reaction product is bonded to the hydroxyl group of the water molecule, and LiOH is produced.

LiOH is water soluble and absorbs moisture in the presence of water in the vapor phase to form a lithium hydroxide layer. As a result, a surface ion conductive layer composed of a lithium hydroxide layer is formed on the surface of the reaction product. The lithium hydroxide layer constituting the surface ion conducting layer is in the liquid phase mainly composed of an aqueous lithium hydroxide solution. However, the surface ion conducting layer is not necessarily in the liquid phase.

By this surface ion conductive layer, a lithium ion conductive layer is formed in the reaction field of the positive electrode 20. As a result, when charge is performed after discharge in the air battery 2, occurrence of an overvoltage in which the voltage greatly rises in the middle of the battery capacity can be suppressed, and charge and discharge can be stably performed.

The magnitude of the ionic conductivity of the surface ion conducting layer varies based on the moisture content (that is, humidity) of the gas phase contained in the supplied gas. Specifically, when the humidity of the supply gas is high, the surface liquid phase expands and when the humidity of the supply gas is low, the surface ion conductive layer shrinks.

If the surface ion conductive layer is excessively enlarged, there is a possibility that the reaction product is reduced and the surface ion conductive layer flows out. Further, if the surface ion conducting layer is excessively reduced, there is a possibility that charge and discharge of the air battery 2 cannot be stably carried out.

For this reason, it is necessary to properly control the humidity of the supply gas and maintain the surface ion conducting layer appropriately during the operation of charge and discharge of the air battery 2. The humidity of the supply gas can be adjusted by controlling the humidification amount by the humidity adjuster 6.

If the gaseous water contained in the supply gas condenses on the surface of the positive electrode 20, there is a possibility that the surface ion conductive layer becomes excessive. Therefore, in the present embodiment, the amount of water vapor contained in the supply gas is set to be smaller than the amount of saturated water vapor at the battery temperature.

When the water vapor partial pressure of the supply gas and the saturated vapor pressure (hereinafter referred to as "LiOH saturated vapor pressure") when the lithium hydroxide layer constituting the surface ion conductive layer is saturated aqueous solution are equal, the surface ion conductive layer are in an equilibrium state. That is, if the water vapor partial pressure of the feed gas is higher than the LiOH saturated vapor pressure, the surface ion conducting layer expands, and when the water vapor partial pressure of the supply gas is lower than the LiOH saturated vapor pressure, the surface ion conducting layer shrinks.

Figure 6:
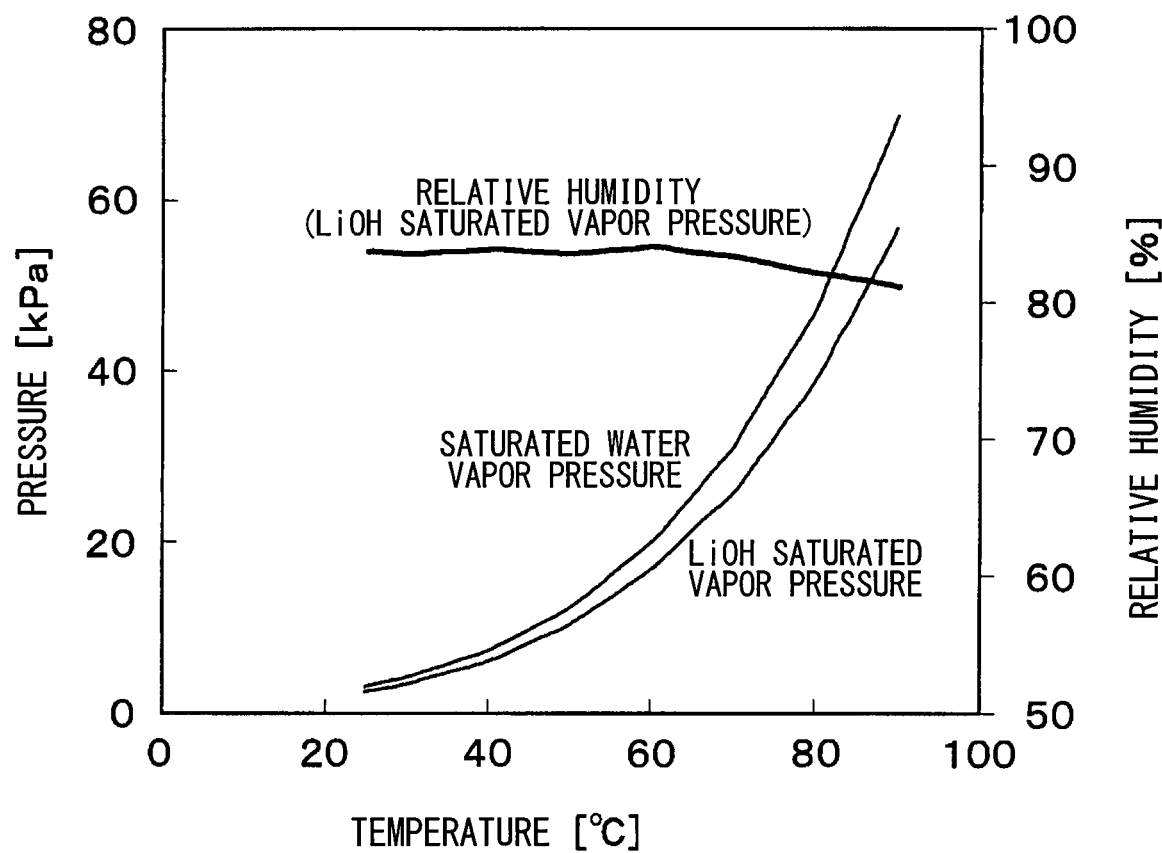
FIG. 6 is a diagram showing saturated vapor pressure of water and a saturated aqueous solution of lithium hydroxide.

FIG. 6 shows changes in saturated water vapor pressure and LiOH saturated vapor pressure with temperature change and humidity corresponding to LiOH saturated vapor pressure. As shown in FIG. 6, the saturated water vapor pressure and the LiOH saturated vapor pressure change according to the temperature change, and the saturated water vapor pressure and the LiOH saturated vapor pressure increase as the temperature rises.

The LiOH saturated vapor pressure is lower than the saturated water vapor pressure under the vapor pressure drop by the aqueous solution. In addition, since the solubility of lithium hydroxide increases as the temperature rises, the difference between the saturated water vapor pressure and the LiOH saturated vapor pressure increases.

Since the saturated water vapor pressure is 100% humidity, the ratio of the LiOH saturated vapor pressure to the saturated water vapor pressure is the humidity (%) corresponding to the LiOH saturated vapor pressure. As shown in FIG. 6, the humidity corresponding to the LiOH saturated vapor pressure is around 84% although varying with the temperature. Therefore, by controlling the humidity of the supply gas at the battery temperature to be around 84%, the surface liquid phase can be brought into an equilibrium state.

If the humidity of the supply gas is too low, the surface ion conducting layer will be too reduced. Therefore, the humidity of the supply gas is desirably 60% or more. If the humidity of the supply gas is too high, the surface ion conducting layer will be too expanded. Therefore, the humidity of the supply gas is desirably 90% or less.

Therefore, in the present embodiment, the humidification amount of the supply gas by the humidity adjuster 6 is controlled so as to be within the range of 60 to 90% of the humidity at the battery temperature. From the viewpoint of stably maintaining the surface ion conductive layer without enlarging the surface ion conductive layer, it is preferable to set the humidification amount of the supply gas at the normal time to be lower than the humidity corresponding to the LiOH saturated vapor pressure. The desired humidity range of the supply gas may vary depending on the type of the catalyst 20b.

As shown in FIG. 6, the LiOH saturated vapor pressure varies depending on the temperature change. In this embodiment, even when the LiOH saturated vapor pressure changes with temperature change, the ratio of the humidity of the supply gas to the LiOH saturated vapor pressure is set to a constant value.

Further, the humidification amount of the supply gas may be set based on the charge and discharge current density of the intended air battery 2.

The charge and discharge current density of the air battery 2 is related to the ion conductivity of the surface ion conductive layer. As the ion conductivity of the surface ion conductive layer increases, the charge and discharge current density of the air battery 2 increases correspondingly. As the ionic conductivity of the surface ion conductive layer decreases, the charge and discharge current density of the air battery 2 decreases correspondingly.

The ionic conductivity of the surface ion conducting layer is related to the humidity of the supply gas. As the humidity of the supply gas increases, the ionic conductivity of the surface ion-conducting layer increases correspondingly. As the humidity of the supply gas decreases, the ion conductivity of the surface ion conductive layer decreases correspondingly.

That is, the humidity of the supply gas may be set so that the surface ion conductive layer has ion conductivity according to the charge and discharge current density of the intended air battery 2. When the target charge and discharge current density of the air battery 2 is high, the humidity of the supply gas may be set high correspondingly. When the charge and discharge current density of the intended air battery 2 is low, the humidity of the supply gas may be set low correspondingly.

As described above, it is not preferable, from the viewpoint of stably maintaining the surface ion conductive layer, that the humidity of the supply gas is much higher than the humidity corresponding to the LiOH saturated vapor pressure. Therefore, when a high output of the air battery 2 is required, as a temporary measure, it is desirable to increase the humidification amount of the supply gas and increase the ionic conductivity of the surface ion conductive layer.

In the present embodiment, the pore diameter of the Ti porous material constituting the Ti electrode 20a is set to 5 μm or less. On the surface of the Ti electrode 20a, solid state $Li_2O_2$ is generated at the time of discharge, and $Li_2O_2$ is decomposed at the time of charge. If the pore diameter of the Ti porous material is too large, $Li_2O_2$ near the pores is likely to be decomposed preferentially when $Li_2O_2$ is decomposed during charge, and $Li_2O_2$ separated from the pores is not easily decomposed.

For this reason, $Li_2O_2$ tends to remain at a site distant from the pores, and the $Li_2O_2$ is less likely to be decomposed uniformly. For this reason, in order to facilitate uniform decomposition of $Li_2O_2$ during charge, it is desirable to set the pore diameter of the Ti porous material 5 μm or less. Also, if the pore diameter of the Ti porous material is too small, the diffusion of the gas is likely to be inhibited by the reaction product. Therefore, the pore size of the Ti porous material is desirably 0.1 μm or more.

Figure 7:
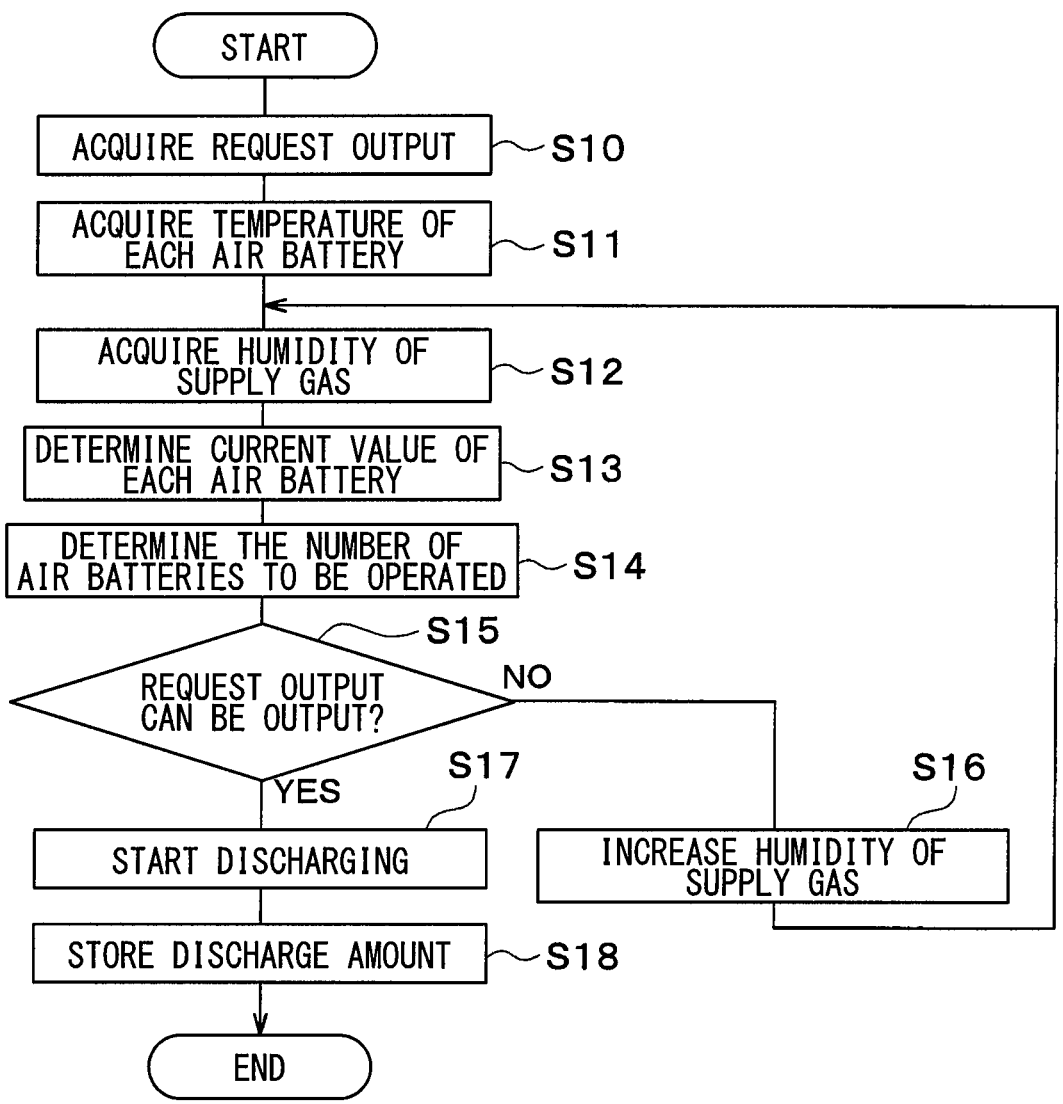
FIG. 7 is a flowchart showing output control of the lithium air battery system.

Next, output control of the lithium air battery system 1 will be described. The output control of the lithium air battery system 1 is executed by the controller 7 based on the flowchart of FIG. 7.

First, the request output for the lithium air battery system 1 is acquired in S10. The request output is the power required for external power consuming equipment.

Next, in S11, the temperature of each air battery 2 is acquired by the temperature sensor 8. In S12, the humidity of the supply gas is acquired based on the humidification amount of the supply gas supplied by the humidity adjuster 6 and the battery temperature acquired in S11.

Next, in S13, the current value of each air battery 2 is determined so that the reaction overvoltage becomes a predetermined voltage. The predetermined voltage is set to 2.96 V or less, which is the electromotive force in the two-electron reaction (P1 reaction) between lithium ions and oxygen. In the process of S13, a control map (see FIG. 5) is selected for each air battery 2 from the battery temperature and the humidity of the supply gas, and a current value corresponding to the predetermined voltage is determined for each air battery 2 using this control map.

Next, the number of air batteries 2 required for outputting the request output in the process of S14 is determined. The number of the air batteries 2 to be operated may be determined so that the total output obtained by summing the outputs (voltage×current) of the plurality of air batteries 2 becomes the required output. In the process of S14, the number of air batteries 2 to be operated is determined so that the voltage of each air battery 2 becomes 2.96 V or less.

When the number of the air batteries 2 to be operated is smaller than the total number of the air batteries 2, the air battery 2 to be operated is determined based on the discharge amount of each air battery 2 so far. Specifically, the air battery 2 having a low discharge amount so far is preferentially used.

Next, in S15, it is determined whether the request output can be output by the air battery 2 of the lithium air battery system 1. In the process of S15, it is determined whether the total output of the plurality of air batteries 2 calculated in S14 exceeds the request output.

If it is determined in S15 that the request output cannot be output, the humidity of the supply gas is increased in S16, and the process returns to S12. In the process of S16, the humidification amount of the supply gas may be increased by the humidity adjuster 6. By increasing the humidity of the supply gas, the current density of the air battery 2 can be increased.

If it is determined in S15 that the request output can be output, discharging of the air battery 2 to be operated is started in S17. The discharge amount of each air battery 2 is stored in S18.

Here, the charge and discharge efficiency of the lithium air battery system 1 will be explained in the case where the P2 reactant is generated by the two-electron reaction of lithium ions and oxygen at the positive electrode 20 and the case where the P1 reactant is generated by the two-electron reaction of lithium ion and oxygen at the positive electrode 20. The relationship between the voltage and the current of the air battery 2 is determined based on the control map of FIG. 5. Further, it is assumed that electric power of about 30 mW is output by discharging of a plurality of air batteries 2.

In the P2 reaction, assuming that the voltage at the time of discharge is 3.0 V, the current value is 0.1 mA and the voltage at the time of charge with the same current value is 3.75 V. Therefore, by using 100 air batteries 2, the total output of the electric energy at the time of discharge is 3.0 V×0.1 mA×100=30 mW. Further, the total input of electric energy during charging is 3.75 V×0.1 mA×100=37.5 mW. Therefore, the energy loss in the case of generating the P2 reactant by two-electron reaction is 37.5 mW−30 mW=7.5 mW.

In the P1 reaction, assuming that the voltage at the time of discharge is 2.8 V, the current value is 0.2 mA, and the voltage at the time of charging with the same current value is 3.1 V. Therefore, by using 54 air batteries 2, the total output of the electric energy at the time of discharge is 2.8 V×0.2 mA×54=30.2 mW. Further, the total input of electric energy during charge is 3.1 V×0.2 mA×54=33.5 mW. Therefore, the energy loss when generating the P1 reactant by two-electron reaction is 33.5 mW−30.2 mW=3.3 mW.

In this way, when outputting the same power, the energy loss is smaller in the P1 reaction than in the P2 reaction, and the charge and discharge efficiency is higher. Also, the number of air batteries 2 required for outputting the same electric power is smaller in the P1 reaction than in the P2 reaction.

According to the present embodiment described above, multiple kinds of reaction products (P1 product and P2 product) are generated in the positive electrode 20 at the time of discharge in the air battery 2. The charge and discharge efficiency of these reaction products varies depending on the kinds, and the P1 product has higher charge and discharge efficiency than the P2 product. Therefore, in the present embodiment, the current control is performed so as to obtain the voltage at which the $Li_2O_2$ is preferentially generated at the positive electrode 20 during discharge. As a result, $Li_2O_2$ can be effectively generated as the reaction product in the cathode 20, and the charge and discharge efficiency of the air battery 2 can be improved.

Further, according to the present embodiment, in the lithium air battery system 1 including a plurality of air batteries 2, current control is performed so that the voltage at the time of discharge for each air battery 2 becomes a predetermined value. As a result, in each of the plurality of air batteries 2, appropriate voltage control can be maintained at the time of discharge, and the charge and discharge efficiency of each air battery 2 can be improved.

In this embodiment, as the cathode 20, the Ti electrode 20a made of an electrode material having low catalytic ability for dissociation of oxygen and the Pt electrode 20b made of an electrode material having high catalytic ability for oxygen dissociation are combined. Thereby, in the Ti electrode 20a, the generation of LiOH is not promoted when decomposing $Li_2O_2$ during charge and the charge efficiency can be increased.

By combining the Ti electrode 20a and the Pt electrode 20b as the cathode 20, it is possible to promote the generation of $Li_2O_2$ at the Ti electrode 20a by using LiOH generated at the Pt electrode 20b during discharge as a lithium ion conduction path.

Other Embodiments (1) In the above embodiments, the example in which the electrochemical device of the present disclosure is a lithium air battery has been described. However, the present invention is not limited thereto, and the electrochemical device of the present disclosure may be used for applications other than batteries. For example, the electrochemical device of the present disclosure can be used as a gas storage and release device that occludes or releases oxygen at the cathode 20.

(2) In the above described embodiment, the air battery 2 is provided as a unit cell including the pair of electrodes 20, 21 and the solid electrolyte layer 22. However, the present disclosure is not limited thereto, and the air battery 2 may be a stacked type air battery.

(3) In the above described embodiment, the cathode 20 is provided by combining the Ti electrode 20a and the Pt electrode 20b. However, the present disclosure is not limited thereto, and the Pt electrode 20b may not be provided. In this case, by preliminarily attaching at least one selected from a group of LiOH and $Li_2O_2$ to the surface of the Ti electrode 20a, generation of $Li_2O_2$ at the Ti electrode 20a at the time of discharge can be promoted.

(4) In the above described embodiment, the Pt electrode 20b is disposed between the Ti electrode 20a and the solid electrolyte layer 22. However, the present disclosure is not limited thereto. For example, the particle-like Pt electrodes 20b may be scattered in the Ti porous material included in the Ti electrode 20a.

(5) In the above described embodiment, the supply gas is humidified by the humidifier included in the humidity adjuster 6. However, the humidity adjuster 6 at least needs to be able to adjust the humidity of the supply gas, and the humidity adjuster 6 may dehumidify the supply gas.

(6) In the above embodiment, the humidification amount of the supply gas by the humidity adjuster 6 is increased in order to raise the humidity of the supply gas in the processing of S16. However, the present disclosure is not limited thereto. A temperature adjuster adjusting the temperature of the air battery 2 may be provided and the humidity of the supply gas may be increased by lowering the battery temperature.

Although the present disclosure is described based on the above embodiments, the present disclosure is not limited to the embodiments and the structures. Various changes and modification may be made in the present disclosure. In addition, while the various elements are shown in various combinations and configurations, which are exemplary, other combinations and configurations, including more, less or only a single element, are also within the spirit and scope of the present disclosure.

Optional aspects of the present disclosure will be set forth in the following clauses.

According to an aspect of the present disclosure, an electrochemical device system includes an electrochemical device and a controller. The electrochemical device includes a negative electrode capable of occluding and releasing lithium ion, a positive electrode using oxygen as a positive electrode active material and reducing oxygen during discharge, and a solid electrolyte disposed between the negative electrode and the positive electrode and capable of conducting lithium ion. The controller performs current control during discharge of the electrochemical device.

In the positive electrode, a reaction product is generated from oxygen and lithium ion during discharge and the reaction product is decomposed into oxygen and lithium ion during charge. Multiple kinds of the reaction product are generated based on discharge voltages, and charge voltages of the multiple kinds of the reaction product are different from each other. The controller performs the current control controlling a discharge voltage to a predetermined voltage generating a lower reaction product that has a charge voltage lower than other reaction product among the multiple kinds of the reaction product.

According to the aspect of the present disclosure, the current control is performed such that the lower reaction product having a lower charge voltage is preferentially generated among the multiple kinds of the reaction product generated in the positive electrode during discharge. Thereby, the charge and discharge efficiency of the electrochemical device can be improved.

What is claimed is:

1. An electrochemical device system comprising:
an electrochemical device including:
a negative electrode capable of occluding and releasing lithium ion;
a positive electrode using oxygen as a positive electrode active material and reducing oxygen during discharge; and
a solid electrolyte disposed between the negative electrode and the positive electrode and capable of conducting lithium ion; and
a controller including a processor and a memory that stores instructions configured to, when executed by the processor, cause the processor to execute current control during discharge of the electrochemical device, wherein
in the positive electrode, a reaction product is generated from oxygen and lithium ion during discharge and the reaction product is decomposed into oxygen and lithium ion during charge,
multiple kinds of the reaction product are generated based on discharge voltages,
charge voltages of the multiple kinds of the reaction product are different from each other, and
the instructions are configured to, when executed by the processor, further cause the processor to execute the current control controlling a discharge voltage to a predetermined voltage generating a lower reaction product that has a charge voltage lower than other reaction product among the multiple kinds of the reaction product.

2. The electrochemical device system according to claim 1, wherein
the lower reaction product is $Li_2O_2$, and
the predetermined voltage is equal to or less than 2.96 V.

3. The electrochemical device system according to claim 1, wherein
the positive electrode includes a low catalytic ability material that has a catalytic ability for dissociation of oxygen lower than Pt.

4. The electrochemical device system according to claim 3, wherein
the low catalytic ability material is at least one selected from a group of Ti, Ni, Au, carbon and a conductive oxide.

5. The electrochemical device system according to claim 3, wherein
the positive electrode includes a high catalytic ability material that has a catalytic ability for dissociation of oxygen higher than the low catalytic ability material.

6. The electrochemical device system according to claim 5, wherein
the high catalytic ability material is at least one selected from a group of Pt and $NiCo_2O_4$.

7. The electrochemical device system according to claim 3, wherein
at least one selected from a group of LiOH and $Li_2O_2$ is preliminarily attached to the positive electrode.

8. The electrochemical device system according to claim 1, wherein
the positive electrode includes a porous material having a pore size equal to or less than 5 μm.

9. The electrochemical device system according to claim 1, comprising a plurality of the electrochemical devices, wherein
the controller performs the current control controlling a discharge voltage to the predetermined voltage in each of the plurality of the electrochemical devices.

10. The electrochemical device system according to claim 1, wherein
oxygen is stored in the positive electrode during discharge and the oxygen stored in the positive electrode is released during charge.

11. The electrochemical device according to claim 1, wherein the instructions are configured to, when executed by the processor, further cause the processor to store a discharge amount of the electrochemical device.

* * * * *